April 7, 1953   C. F. OSGOOD   2,634,008
MATERIAL HAULAGE VEHICLE
Filed Dec. 16, 1946   4 Sheets-Sheet 1
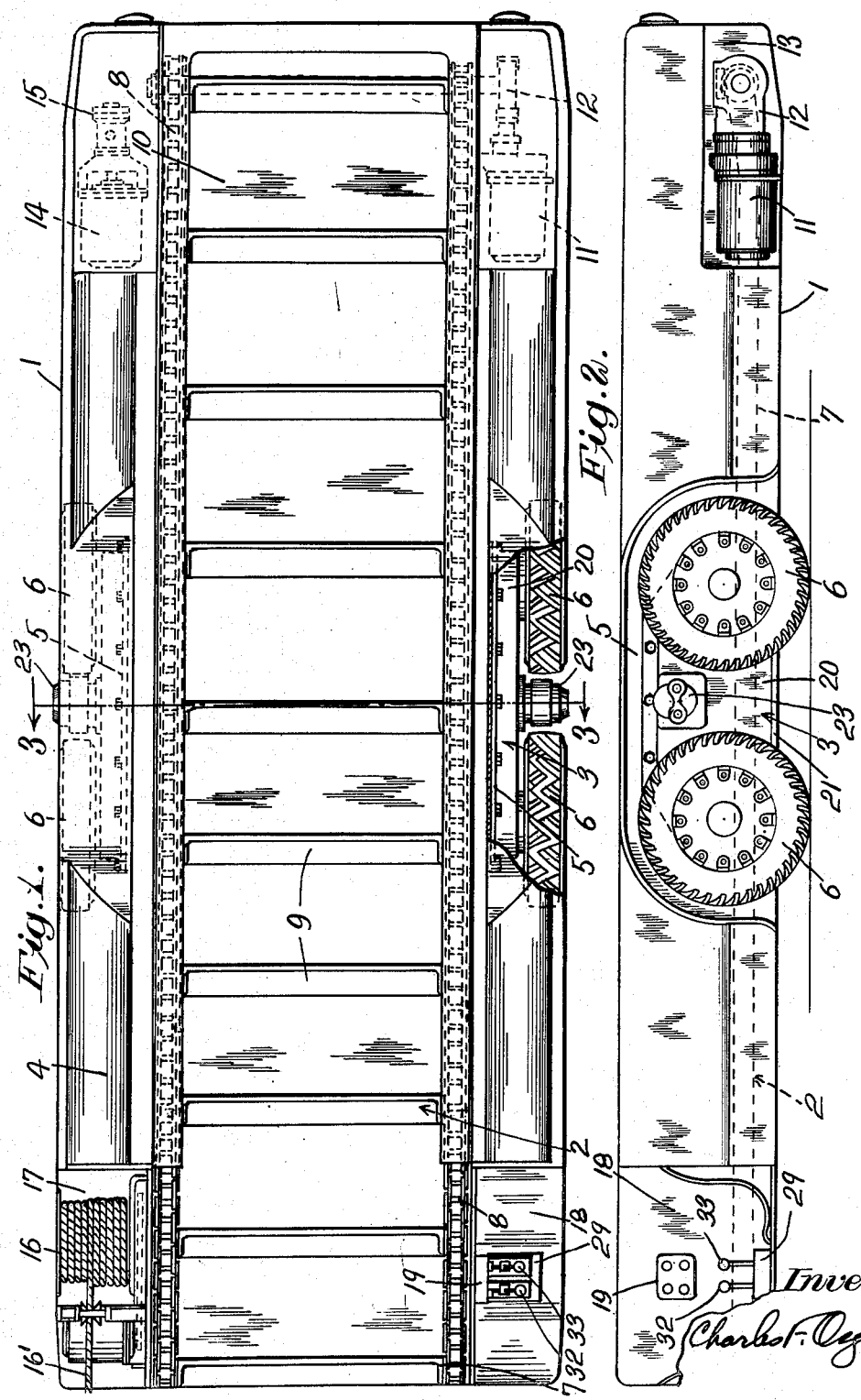
Inventor:
Charles F. Osgood

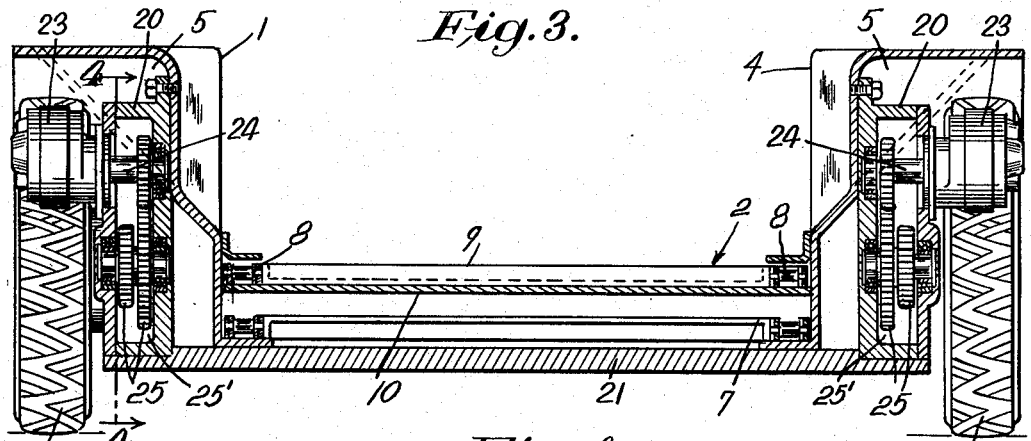
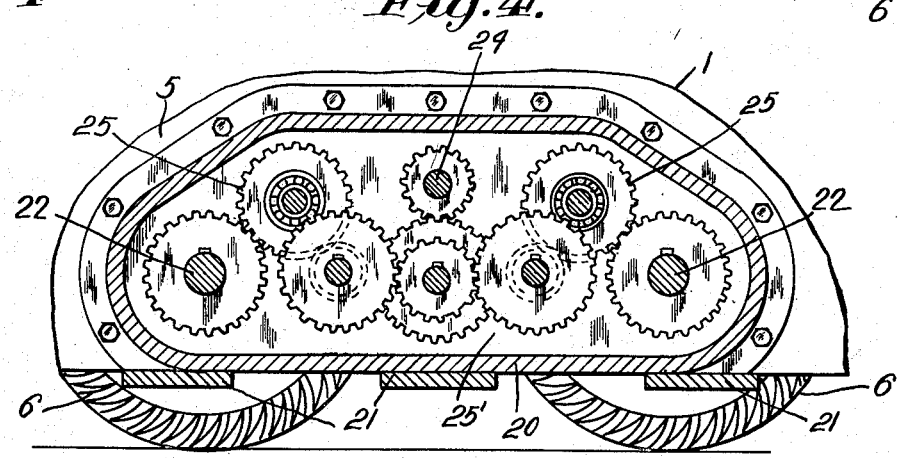
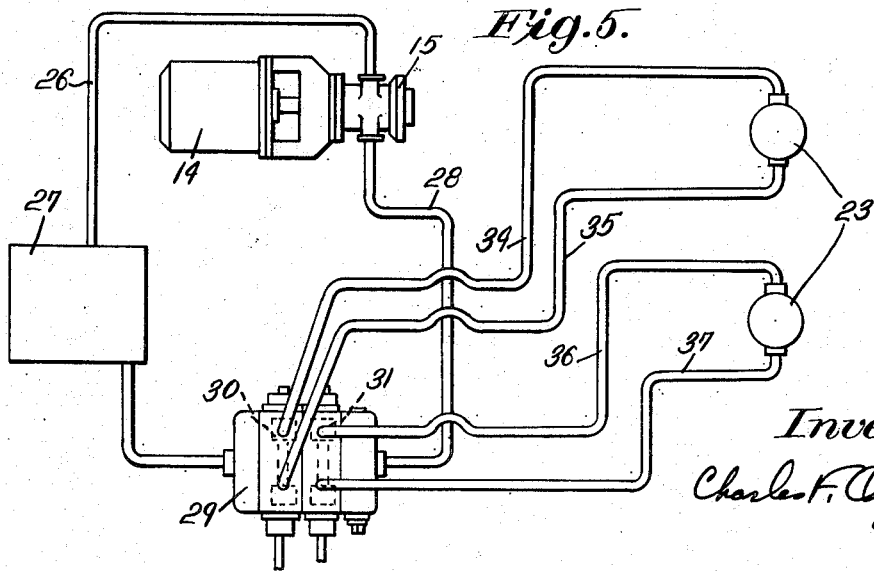
Inventor:
Charles F. Osgood,

April 7, 1953  C. F. OSGOOD  2,634,008
MATERIAL HAULAGE VEHICLE
Filed Dec. 16, 1946  4 Sheets-Sheet 3
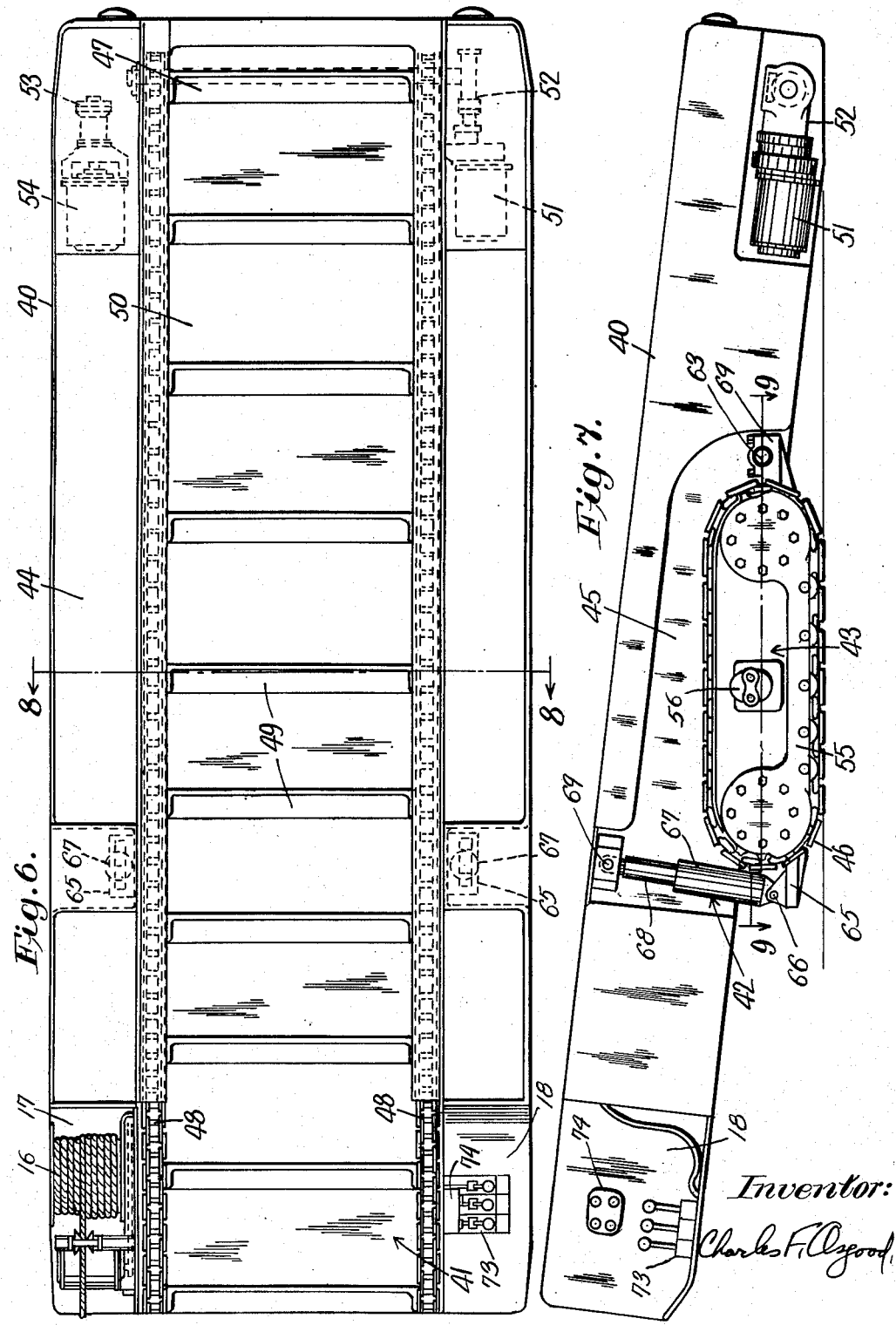
Inventor:
Charles F. Osgood April 7, 1953  C. F. OSGOOD  2,634,008
MATERIAL HAULAGE VEHICLE
Filed Dec. 16, 1946  4 Sheets-Sheet 4
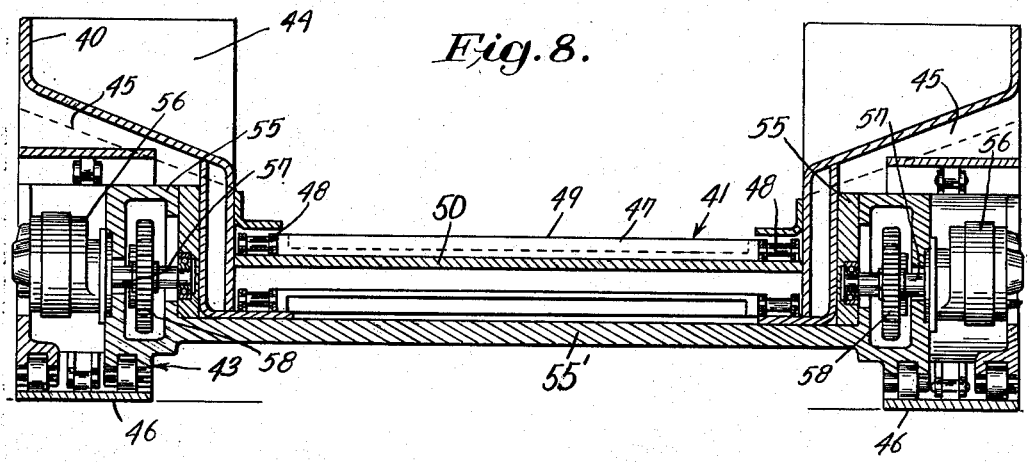

Patented Apr. 7, 1953

2,634,008

UNITED STATES PATENT OFFICE 2,634,008

MATERIAL HAULAGE VEHICLE

Charles F. Osgood, Franklin, Pa., assignor to Joy Manufacturing Company, a corporation of Pennsylvania Application December 16, 1946, Serial No. 716,619

11 Claims. (Cl. 214—83.36)

This invention relates to material haulage vehicles and more particularly to improvements in a material haulage vehicle of the type commonly known as a "shuttle car" for hauling loose material in underground trackless mines.

An object of the present invention is to provide an improved material haulage vehicle. Another object is to provide an improved material haulage vehicle having improved propelling and steering means. Still another object is to provide an improved "shuttle car" especially designed for use in hauling loose material in an underground trackless mine and having a conveyor for unloading the material from the car. A further object is to provide an improved "shuttle car" having an improved arrangement of the traction wheels whereby not only is the propulsion and steering of the car improved but also compactness and relatively large material carrying capacity are attained. A still further object is to provide an improved "shuttle car" having a novel arrangement of the propelling and steering means with respect to the car body. Still another object is to provide an improved "shuttle car" having improved means for tilting the car body to elevate the discharge end of the unloading conveyor. A further object is to provide an improved "shuttle car" having relatively narrow elongated recesses extending longitudinally along the sides of the central portion of the car body and having improved propelling and steering means arranged in an extremely compact manner in the side recesses, thereby resulting in a car having not only great longitudinal compactness but also relatively large material carrying capacity. A still further object is to provide an improved "shuttle car" which may have the same material carrying capacity but of substantially less overall length than conventional "shuttle cars." Another object is to provide an improved shuttle car having an improved close coupled, non-swivelled traction wheel arrangement whereby the traction wheels may be used to effect both propulsion and steering of the car. A still further object is to provide an improved hydraulically operated propelling and steering means for a "shuttle car." These and other objects and advantages of the invention will, however, hereinafter more fully appear.

In the accompanying drawings there are shown for purposes of illustration two forms which the invention may assume in practice.

In these drawings:

Fig. 1 is a top plan view of a shuttle car constructed in accordance with a preferred illustrative embodiment of the invention.

Fig. 2 is a side elevational view of the shuttle car shown in Fig. 1.

Fig. 3 is an enlarged cross-sectional view taken substantially on line 3—3 of Fig. 1.

Fig. 4 is a longitudinal vertical sectional view taken substantially on line 4—4 of Fig. 3.

Fig. 5 is a diagrammatic view illustrating the propelling and steering motors and the associated fluid system.

Fig. 6 is a top plan view of a shuttle car constructed in accordance with another modified embodiment of the invention.

Fig. 7 is a side elevational view of the shuttle car shown in Fig. 6, with the car body in tilted material discharging position.

Fig. 8 is an enlarged cross-sectional view taken substantially on line 8—8 of Fig. 6.

Fig. 9 is an enlarged longitudinal horizontal sectional view taken substantially on line 9—9 of Fig. 7.

Fig. 10 is a diagrammatic view illustrating the propelling and steering motors, the tilting jacks and the associated fluid system.

In the illustrative embodiment of the invention shown in Figs. 1 to 5 inclusive, the improved "shuttle car" generally comprises a material carrying car body 1, conveying means generally designated 2, and propelling and steering means generally designated 3. The car body 1 is of generally rectangular shape and is of an extremely low compact construction, and has a material carrying compartment 4 extending lengthwise thereof. The car body is longitudinally recessed at 5, 5 along the sides of its central portion to receive pairs of propelling and steering wheels 6, 6 of the propelling and steering means 3 and the central portion of the body compartment between the side recesses 5 is relatively narrow (Fig. 3) with widened hopperlike portions at the opposite ends of the side recesses, as shown in Fig. 1. The conveying means 2 comprises an endless circulating conveyor 7 extending along the bottom of the compartment and having parallel side chains 8, 8 guided for circulation in guideways formed within the bottom of the car body. Transverse scraper bars 9 are connected between the side chains for moving the material along a bottom plate 10 secured to the side walls of the body compartment as shown in Fig. 3. The conveyor may be driven by a motor 11, preferably an electric motor, through suitable transmission connections 12, herein arranged within a recess 13 at one end corner of the car body. Arranged in a similar recess at the opposite corner of the same end of the car body is a motor 14, likewise preferably an electric motor, for driving a conventional fluid pump 15. A conventional electric cable reel 16 is arranged in a recess 17 at a corner at the opposite end of the car body and has wound thereon a power conductor cable 16' for conducting electricity to the motors 11 and 14 in a well known manner. The opposite corner at this same end of the car body is recessed at 18 to provide a station for the operator, and conveniently located within this recess is a conventional push button control 19 for the electric motors.

Now referring to the improved propelling and steering means 3 and more particularly to the specific structure thereof, it will be noted that rigidly secured to the outer sides of the central portion of the car body within the side recesses 5 are relatively heavy side frames 20, 20 having a cross connecting portion 21 extending beneath the car body, thereby rigidly to brace the latter. Also arranged within the side recesses 5 of the car body at the outer sides of the frame 20 are the pairs of close coupled, non-swivelled propelling and steering wheels 6, 6, and these wheels are secured to axles 22 (see Fig. 4) suitably journaled within the side frames. Attached to the outer sides of the side frames between the pairs of wheels are conventional reversible fluid motors 23, 23 preferably of the hydraulic type, and the motor power shafts 24 are connected through spur reduction gearings 25 to the wheel axles 22. The spur reduction gearings between the motor power shafts and the wheel axles are enclosed within a lubricant containing chamber 25' within the side frames 20 so that an adequate lubricant bath for the gears is provided. It is accordingly evident that the propelling and steering wheels are geared together in pairs and independently driven by the motors 23.

As shown in Fig. 5, the pump 15 has its intake connected through a conduit 26 to a liquid tank 27, herein formed within the car body beneath the motor 14 and the pump 15, while the pump discharge is connected by a conduit 28 to the pressure passage of a conventional valve box 29. This valve box is conveniently located within the recess 18 which provides the operator's station, and contains conventional slide valves 30 and 31 having suitable operating handles 32 and 33 respectively. The slide valve 30 controls the flow of liquid under pressure to and the exhaust of fluid from one of the motors 23 through conduits 34 and 35, while the slide valve 31 controls the flow of liquid under pressure to and the exhaust of fluid from the other of said motors 23 through conduits 36 and 37.

The general mode of operation of the preferred embodiment above described is as follows: The compartment 4 of the car body may be filled with material to be hauled in any suitable manner, as for example by a mobile coal loading machine, and during the loading operation the motors 23 may be concurrently operated under the control of the slide valves 30 and 31 to move the "shuttle car" bodily longitudinally with respect to the loading machine, and the conveyor 7 may be intermittently operated by the motor 11 so that complete filling of the material carrying compartment may be obtained. When the material carrying compartment of the car body is completely filled, the fluid motors 23 may be operated under the control of the slide valves 30 and 31 to effect concurrent driving of the pairs of propelling wheels 6 at the same speed to effect bodily movement of the "shuttle car" away from the loading machine and through the passageways of the mine, and by varying the speed of one of the motors with respect to the other under the control of the slide valves, the wheels of one pair may be slowed down to effect turning of the shuttle car in the desired direction. Due to the close coupled arrangement of the pairs of propelling wheels, the "shuttle car" may be sharply turned in one direction or the other, thereby to facilitate movement of the "shuttle car" through the sharply curved passageways of the mine. When the "shuttle car" has reached its unloading station, the motor 11 may be operated to drive the conveyor 7, thereby to move the material in the compartment 4 of the car body out of the compartment to a suitable point of discharge. By arranging the propelling and steering wheels within the relatively shallow elongated recesses 5, 5 at the sides of the car body and by directly gearing the wheels of each pair together, the wheels may operate in a manner similar to that of track laying treads, thereby avoiding the necessity of relatively complicated swivel mountings for the wheels and linkage mechanisms for turning the wheels. When the contents of the car have been unloaded from the material receiving compartment, the wheel driving motors 23 may be reversed and the "shuttle car" propelled bodily along the mine passageways back to the point of starting near the loading machine, and during this movement of the car, steering may be effected by variably controlling the speed of the motors 23, 23.

In the modified illustrative embodiment of the invention shown in Figs. 6 to 10 inclusive, the shuttle car generally comprises a material carrying car body 40, conveying means generally designated 41, car body tilting means generally designated 42, and propelling and steering means generally designated 43. The car body 41 is of generally rectangular shape and of an extremely compact construction and has a hopperlike material carrying compartment 44 extending lengthwise thereof. As in the preferred embodiment above described, the car body along the sides of its central portion is longitudinally recessed at 45 to receive the endless propelling and steering treads 46 of the propelling and steering means. The conveying means comprises an endless conveyor 47 extending along the bottom of the compartment and having side chains 48, 48 suitably guided in guideways within the bottom portion of the car body and having cross connecting scraper bars 49 which move the material along a bottom plate 50 secured to the inner side walls of the material carrying compartment as shown in Fig. 8. As in the embodiment above described, the conveyor may be driven by a motor 51 through suitable transmission connections 52, while a pump 53 is driven by a motor 54. A similar cable reeling mechanism and an operator's station are provided at the end of the car opposite from the end at which the motors 51 and 54 are located. The endless traction treads 46 of the propelling and steering means 43 are guided on side frames 55 arranged in the side recesses 45 at the opposite sides of the car body and having a cross connection frame 55' extending beneath the car body between these side frames. Attached to the side frames within the orbits of the endless treads are conventional reversible fluid motors 56 which have their power shafts 57 connected through reduction gearing 58 to shafts 59 suitably journaled within the side frames. The reduction gearings are enclosed within the side frame and run in a suitable lubricant bath. Fixed to the shafts 59 are drive sprockets 60 which engage and drive the endless traction treads 46. The treads extend around the drive sprockets 60 and along the tread frames and around idler sprockets 61 secured to shafts 62 likewise suitably journaled within the side frames. In this improved construction the car body has lateral trunnions 63 journaled in bearing brackets 64 integral with one end of the side frames, and the side frames at their opposite ends have projecting brackets 65. Pivotally connected at 66 to these latter brackets are hydraulic jack cylinders 67 of the body tilting means 42. These jack cylinders contain reciprocable pistons having their piston rods 68 pivotally connected at 69 (Fig. 7) to the upper sides of the car body. When the car body is in lowered horizontal position with respect to the tread frames, the bottom of the car body rests firmly on the cross connecting frame 55' so that a rigid support for the car body during transport of the material is provided.

As shown in Fig. 10, the pump 53 has its intake connected by a conduit 70 to a liquid tank 71 formed within the car body beneath the motor 54 and pump 53, while the pump discharge is connected by a conduit 72 to the pressure passage of a conventional valve box 73. This valve box is conveniently located within the recess which provides the operator's station, and also arranged in this recess is a conventional push button control 74 for the motors 51 and 54 in a manner similar to the embodiment above described. The valve box contains three conventional slide valves 75, 76 and 77. The slide valve 75 controls the flow of liquid under pressure to and the exhaust of fluid from one of the motors 56 through conduits 78 and 79, while the slide valve 77 controls the flow of liquid to and the exhaust of fluid from the other of said motors 56 through conduits 80 and 81. The valve 76 controls the flow of fluid to the jack cylinders 67 and the exhaust of fluid from the jack cylinders through a conduit 82.

The general mode of operation of the modified embodiment of the invention above described is as follows: The compartment 44 of the car body may be suitably loaded with material in a manner similar to that above described in connection with the preferred embodiment of the invention, and during the loading operation the car body is tilted downwardly into a horizontal position wherein it rests on the cross frame 55' extending between the tread side frames 55. During the loading operation and when the car body is loaded, the motors 56 may be operated under the control of the slide valves 75 and 77 to effect concurrent drive of the treads 46, thereby to propel the "shuttle car" bodily in a longitudinal direction, and as the "shuttle car" travels through the sharply curved passageways of the mine, one of the motors 56 may be slowed down so that one tread is driven faster than the speed of the other thereby to effect sharp turning of the "shuttle car" in the desired direction. When the unloading station is reached, the operator may manipulate the slide valve 76 to supply liquid under pressure to the cylinders 67 of the hydraulic jacks thereby to tilt the car body in a vertical direction about its pivotal mounting on the tread frames until the car body assumes the tilted position shown in Fig. 7 with one end of the body in adjacency to or resting directly on the floor of the mine. With the car body so tilted, the motor 51 may be operated to drive the endless conveyor 47, thereby to discharge the contents of the car onto a belt conveyor or other suitable receptacle. By arranging the tread frames within the narrow side recesses of the car body, it is possible to increase the capacity of the car while decreasing the longitudinal dimensions thereof, and by driving the treads through the independent fluid motors, improved steering is obtained. By tilting the entire car body relative to the tread frames, it is possible to elevate the discharge end of the conveyor in an extremely simple manner. When the material is discharged from the car body, the latter is then lowered into a horizontal position simply by exhausting the fluid from the jack cylinders 67 under the control of the slide valve 76, and when the car body is in lowered position, the motors 56 may be reversed under the control of the slide valves 75 and 77 to effect movement of the "shuttle car" bodily back to its place of starting so that it may again be loaded.

As a result of this invention, it will be noted that an improved "shuttle car" is provided which, due to the provision of improved propelling and steering means, relatively large capacity is obtained while the overall dimensions of the car are reduced to a minimum. By the provision of the close coupled, non-pivotable propelling wheels and the independent driving means therefor, the "shuttle car" may be readily moved through the sharply curved passageways of an underground mine. By pivotally mounting the car body on the frames of the propelling means and by the provision of the hydraulic jacks for tilting the car body, it is possible readily to elevate the discharge end of the conveyor so that the material may be unloaded onto a suitable conveyor or other receptacle. Further, by constructing the side frames in the manner disclosed and by the provision of the cross connecting frame extending beneath the car body, an extremely rugged as well as compact construction is obtained. Other uses and advantages of the invention will be clearly apparent to those skilled in the art.

While there are in this application specifically described two forms which the invention may assume in practice, it will be understood that these forms of the same are shown for purposes of illustration and that the invention may be further modified and embodied in various other forms without departing from its spirit or the scope of the appended claims.

What I claim as new and desire to secure by Letters Patent is:

1. In a material haulage vehicle for use in underground mines, a low, compact body having parallel sides and provided with a wide material receiving compartment extending lengthwise thereof centrally between the sides of said body and narrow, elongated, vertical recesses extending longitudinally along the sides of the longitudinal central portion of said body, said body having an operator's station at one side thereof near one end of the body, said compartment at its narrowest portion being of a width substantially greater than the combined widths of said recesses, said compartment at its narrowest portion extending nearly the full width of the space between said side recesses, propelling and steering means for the vehicle arranged in said side recesses with each propelling and steering means occupying nearly the full width of its associated recess, said means comprising side frames arranged in said side recesses at the sides of said body for supporting the latter and having a cross connecting portion extending beneath said body, propelling and steering devices mounted on said side frames within said side recesses and confined to movement in parallel longitudinal vertical planes within the lateral limits of said body, said compartment extending down between and beneath the tops of said propelling and steering devices with the outer compartment walls located at and in close adjacency to the inner sides of said side frames, driving motors mounted on said side frames within said recesses respectively, reduction gearings enclosed within said side frames for respectively operatively connecting said motors to said propelling and steering devices, and remote control means for said motors including motor control elements located at the operator's station for concurrently effecting operation of said motors at the same speed or at relatively different speeds whereby said propelling and steering devices may effect propulsion and steering of the vehicle.

2. In a material haulage vehicle for use in underground mines, a low, compact, elongated body having a wide material receiving compartment extending lengthwise thereof centrally between the sides of said body and narrow, elongated, vertical recesses extending longitudinally along the sides of the longitudinal central portion of said body, said compartment at its narrow central portion being of a width substantially greater than the combined widths of said recesses and extending nearly the full width of the space between said side recesses, and propelling and steering means for the vehicle arranged in said side recesses with each propelling and steering means occupying nearly the full width of its associated recess, said means comprising side frames secured to the sides of said body within said side recesses at the inner walls of said recesses and having a cross connecting portion extending beneath said body rigidly to brace the latter, close coupled, non-swingable propelling and steering wheels arranged in said recesses at the outer sides of said frames and journaled on the latter, said propelling and steering wheels confined to movement in parallel longitudinal vertical planes, said compartment extending down between and beneath the tops of said wheels with the outer walls of said compartment lying close to the inner sides of said side frames, motors mounted on said side frames respectively within said side recesses, and reduction gearings enclosed in said side frames respectively for operatively connecting said motors to said wheels in pairs whereby said wheels while confined against lateral turning may propel and steer the vehicle.

3. In a material haulage vehicle for use in underground mines, a low, compact, elongated body having a wide material receiving compartment extending lengthwise thereof centrally between the sides of said body and narrow, elongated, vertical recesses extending longitudinally along the sides of the longitudinal central portion of said body, said compartment having hopperlike portions at the opposite ends of said body forwardly and rearwardly beyond the ends of said recesses, said hopperlike portions extending laterally to the outer sides of said recesses and the relatively narrow portion of said compartment between said hopper-like portions being of a width substantially greater than the combined widths of said recesses and extending nearly the full width of the space between said side recesses, and propelling and steering means for the vehicle arranged in said side recesses with each propelling and steering means occupying nearly the full width of its associated recess, said means comprising propelling and steering devices arranged within said recesses at each side of said body, said compartment extending down between and below the tops of said propelling and steering devices and the outer walls of said narrow portion of said compartment extending downwardly at the inner sides of said propelling and steering devices, and independent driving and controlling means for said propelling and steering devices whereby said devices may be driven concurrently at the same speed or at relatively different speeds to effect propulsion and steering of the vehicle.

4. In a material haulage vehicle for use in underground mines, a low, compact, elongated body having parallel sides and providing a wide material receiving compartment extending lengthwise thereof centrally between the sides of said body, and narrow, elongated, vertical recesses extending longitudinally along the sides of the longitudinal central portion of said body, said compartment having a narrow longitudinal central portion substantially coextensive with said vertical side recesses and laterally enlarged portions disposed forwardly and rearwardly of said narrow central portion, said compartment at said narrow portion being of a width substantially greater than the combined widths of said recesses and extending nearly the full width of the space between said side recesses, close coupled, non-swingable propelling and steering wheels arranged in pairs in said recesses at each side of said body, said propelling and steering wheels confined to movement in parallel longitudinal vertical planes within the lateral limits of said body, said compartment extending down between said propelling and steering wheels with the compartment bottom disposed below a horizontal plane including the wheel axes, and means for independently driving and controlling said pairs of wheels, for concurrently driving said wheels at the same speed or for driving one pair of side wheels at a speed slower than the speed of the other pair, to effect propelling and steering of the vehicle.

5. In a material haulage vehicle for use in underground mines, a low, compact, elongated body having parallel sides and providing a wide material receiving compartment extending lengthwise thereof centrally between the side of said body and narrow, elongated, vertical recesses extending longitudinally along the sides of the longitudinal central portion of said body, said compartment at its narrowest portion being of a width substantially greater than the combined widths of said recesses and extending nearly the full width of the space between said side recesses, propelling and steering devices arranged in said side recesses at the sides of said body and on which said body is mounted, said propelling and steering devices confined to movement in parallel longitudinal vertical planes within the lateral limits of said body, said compartment extending downwardly between and below the tops of said propelling and steering devices with the compartment bottom disposed in a low position close to a horizontal plane lying midway between the tops and bottoms of said propelling and steering devices, fluid motors arranged within said recesses for driving said propelling and steering devices, a motor driven pump carried by said body, and operator controllable valve devices on said body for controlling the flow of fluid under pressure discharged from said pump to said motors whereby said propelling and steering devices may be concurrently driven at the same speed or one may be driven at a speed slower than the speed of the other, to effect propelling and steering of the vehicle.

6. In a material haulage vehicle for use in underground mines, a low, compact, elongated body having parallel sides and providing a wide material receiving compartment extending lengthwise thereof centrally between the sides of said body and narrow, elongated, vertical side recesses extending longitudinally along the sides of the longitudinal central portion of said body, said compartment having a narrow longitudinal central portion substantially coextensive with said vertical side recesses and laterally enlarged portions disposed forwardly and rearwardly of said narrow central portion, said compartment at said narrow portion being of a width substantially greater than the combined widths of said recesses and extending nearly the full width of the space between said side recesses, propelling and steering devices arranged in said side recesses at the sides of said body and by which said body is supported, said propelling and steering devices confined to movement in parallel longitudinal vertical planes within the lateral limits of said body, said compartment extending downwardly between and below the tops of said propelling and steering devices with its bottom disposed in a low position in adjacency to a horizontal plane lying at the vertical centers of said propelling and steering devices, and means for driving said devices concurrently at the same speed or at relatively different speeds, to effect propulsion and steering of the vehicle.

7. In a material haulage vehicle for use in underground mines, a low, compact, elongated body having parallel sides and providing a wide material receiving compartment extending lengthwise thereof centrally between the sides of said body and narrow, elongated, vertical side recesses extending longitudinally along the sides of the longitudinal central portion of said body, said compartment having a narrow longitudinal central portion substantially coextensive with said vertical side recesses, said compartment having widened hopperlike portions disposed forwardly and rearwardly of said narrow central portion at the opposite ends of said recesses and extending laterally to the outer sides of said recesses and said narrow portion of said compartment between said hopperlike portions being of a width substantially greater than the combined widths of said recesses and extending nearly the full width of the space between said side recesses, propelling and steering devices arranged in said side recesses at the sides of said body and by which said body is supported, said propelling and steering devices confined to movement in parallel longitudinal vertical planes within the lateral limits of said body, said compartment extending down between and below the tops of said propelling and steering devices with the outer walls of said narrow portion extending downwardly at the inner sides of said propelling and steering devices, and means for driving said devices concurrently at the same speed to move the vehicle bodily longitudinally without turning or for driving said devices at relatively different speeds to effect turning of the vehicle.

8. In a material haulage vehicle for use in underground mines, a low, compact, elongated body having parallel sides and providing a wide material receiving compartment extending lengthwise thereof centrally between the sides of said body and narrow, elongated, vertical recesses extending longitudinally along the sides of the longitudinal central portion of said body, said compartment having a narrow longitudinal central portion substantially coextensive with said vertical side recesses, said compartment having widened hopperlike portions disposed forwardly and rearwardly of said narrow central portion at the opposite ends of said recesses and extending laterally to the outer sides of said recesses, said narrow outer walls of the central portion of said body which extend longitudinally between said hopperlike portions forming the inner walls of said recesses, said compartment at said narrow central portion intermediate said recesses being of a width substantially greater than the combined widths of said recesses and extending nearly the full width of the space between said outer walls, and propelling and steering devices arranged in said recesses at the sides and confined within the lateral limits of said body and by which said body is supported and propelled, said compartment extending down between and below the tops of said propelling and steering devices with the outer side walls of said hopperlike portions extending downwardly at the inner sides of said propelling and steering devices.

9. In a material haulage vehicle for use in underground mines, a low, compact, elongated body having parallel sides and providing a wide material receiving compartment extending lengthwise thereof centrally between the sides of said body and narrow, elongated, vertical recesses extending longitudinally along the sides of the longitudinal central portion of the body, said compartment having a narrow longitudinal central portion substantially coextensive with said vertical side recesses, said compartment at said narrow central portion between said side recesses being of a width substantially greater than the combined widths of said recesses and extending nearly the full width of the space between said side recesses, said compartment having widened hopperlike portions spaced longitudinally of said body and disposed forwardly and rearwardly of said central narrow portion at the opposite ends of said side recesses so that the central portion of said compartment extending between said hopperlike portions is narrow as aforesaid but as wide as the major portion of the length of said compartment, traction devices arranged in said side recesses at the sides of said body and having a frame secured to the outer walls of said central portion of said compartment and by which said body is supported, each traction device and its frame occupying nearly the full width of its associated recess and said traction devices confined to movement in parallel longitudinal vertical planes within the lateral limits of said body, said compartment extending down between said traction devices with its bottom disposed in a low position close to a horizontal plane lying at the vertical centers of said traction devices, said bottom of said compartment lying below the tops of said frames and the tops of the traction devices being disposed above said bottom of said compartment bottom, and motor driven mechanism carried by said frames for driving said traction devices to effect propulsion and steering of the vehicle.

10. In a material haulage vehicle for use in underground mines, a low, compact, elongated body having parallel sides and providing a wide material receiving compartment extending lengthwise thereof centrally between the sides of said body and narrow, elongated, vertical recesses extending longitudinally along the sides of the longitudinal central portion of said body, said compartment having a narrow longitudinal central portion substantially coextensive with said vertical side recesses, said compartment at said narrow central portion being of a width substantially greater than the combined widths of said recesses and extending nearly the full width of the space between said side recesses and said compartment having widened hopperlike portions spaced longitudinally of said body and disposed forwardly and rearwardly of said narrow central portion at the opposite ends of said side recesses so that the central portion of said compartment extending between said hopperlike portions is narrow as aforesaid but as wide as the major portion of the length of said compartment, propelling and steering wheels arranged in said side recesses at the sides of said body and by which said body is supported, said propelling and steering wheels confined to movement in parallel longitudinal vertical planes within the lateral limits of said body, said compartment extending down between said propelling and steering wheels with its bottom disposed in a low position, said bottom of said compartment lying a substantial distance below the tops of said propelling and steering wheels, and the axes of said wheels being disposed in a horizontal plane lying above said bottom of said compartment, and motor driven mechanism for driving said propelling and steering wheels to effect propulsion and steering of the vehicle.

11. In a material haulage vehicle for use in underground mines, a low, compact, elongated body having a wide material receiving compartment extending lengthwise thereof centrally between the sides of said body from end to end and narrow, elongated, vertical recesses extending longitudinally along the sides of the longitudinal central portion of said body and having inner walls, said compartment having a hopperlike portion extending between said side recesses with the inclined side walls of said hopperlike portion providing the top walls of said recesses and the lower portion of said hopperlike portion having vertical outer walls which extend longitudinally between said side recesses with the inner walls of said recesses located in close adjacency thereto, said compartment at its narrow central portion between said side recesses being of a width substantially greater than the combined widths of said recesses and having its lower portion extending nearly the full width of the space between said outer walls, and propelling and steering devices arranged in said recesses at the sides and within the lateral limits of said body and by which said body is supported and propelled, said propelling and steering devices confined to movement in parallel longitudinal vertical planes, said compartment extending down between and below the tops of said propelling and steering devices with the outer vertical side walls of the lower portion of said compartment extending downwardly at the inner sides of said propelling and steering devices and with the inclined side walls of said hopperlike portion extending downwardly and inwardly above said propelling and steering devices.

CHARLES F. OSGOOD.

REFERENCES CITED

The following references are of record in the file of this patent:

UNITED STATES PATENTS

| Number | Name | Date |
|---|---|---|
| 494,319 | Brown | Mar. 28, 1893 |
| 1,125,122 | Koenig | Jan. 19, 1915 |
| 1,246,452 | Monroe | Nov. 13, 1917 |
| 1,526,022 | Stage | Feb. 10, 1925 |
| 1,857,343 | Armington et al. | May 10, 1932 |
| 2,046,517 | Jones | July 7, 1936 |
| 2,076,722 | Heinze | Apr. 13, 1937 |
| 2,165,723 | North | July 11, 1939 |
| 2,233,111 | Roberts | Feb. 25, 1941 |
| 2,325,730 | Arentzen et al. | Aug. 3, 1943 |
| 2,325,731 | Arentzen et al. | Aug. 3, 1943 |
| 2,336,386 | Beck | Dec. 7, 1943 |
| 2,344,730 | Ramsey | Mar. 21, 1944 |
| 2,358,236 | Lee | Sept. 12, 1944 |
| 2,359,889 | Bigelow | Oct. 10, 1944 |
| 2,372,475 | Doberstein | Mar. 27, 1945 |
| 2,391,109 | Cartlidge | Aug. 7, 1945 |
| 2,393,324 | Joy | Jan. 22, 1946 |
| 2,405,636 | Beck | Aug. 13, 1946 |
| 2,416,478 | Harbers | Feb. 25, 1947 |
| 2,429,170 | Royle | Oct. 14, 1947 |
| 2,430,945 | O'Brien | Nov. 18, 1947 |
| 2,434,760 | Eggleston | Jan. 20, 1948 |
| 2,488,520 | Beck | Nov. 22, 1949 |